United States Patent
Lübke

[11] Patent Number: 5,709,499
[45] Date of Patent: Jan. 20, 1998

[54] SHAFT COUPLING

[76] Inventor: Herbert Lübke, Stiller Winkel 3, 49536 Lienen, Germany

[21] Appl. No.: 547,238

[22] Filed: Oct. 24, 1995

[30] Foreign Application Priority Data

Nov. 17, 1994 [DE] Germany .................. 44 41 019.0

[51] Int. Cl.$^6$ ............................................. F16B 1/00
[52] U.S. Cl. ......................... 403/316; 403/324; 403/302
[58] Field of Search ............................. 403/354, 348, 403/349, 375, 380, 315, 316, 317, 319, 325, 324, 300, 301, 302, 341

[56] References Cited

U.S. PATENT DOCUMENTS

| | | |
|---|---|---|
| 2,901,258 | 8/1959 | Brandafi .................. 403/349 X |
| 3,362,050 | 1/1968 | McCarthy .................. 403/325 X |
| 4,645,373 | 2/1987 | Purdy . |
| 5,137,495 | 8/1992 | Luebke . |

*Primary Examiner*—Kenneth J. Dorner
*Assistant Examiner*—William L. Miller

[57] ABSTRACT

A shaft coupling, preferably for coupling a journal of a shaft of a print roll to a primary shaft, includes coupling parts which engage one another in an interlocking manner, and which are connected to the shafts to be coupled to one another. A stud projects beyond the periphery of a journal on the end of one shaft and can be pushed into a centering cutout arranged on a sleeve provided on the end of the other shaft and can be fixed there by means of a bearing surface provided in a slide ring which can be pushed over the sleeve.

5 Claims, 3 Drawing Sheets

SHAFT COUPLING

FIELD OF THE INVENTION

The invention pertains to a shaft coupling, preferably for coupling a journal of a shaft of a print roll to a primary shaft, with coupling parts which engage with one another in an interlocking manner, which are connected to the shafts to be coupled to one another.

BACKGROUND OF THE INVENTION

Shaft couplings of this type are known, for example, from EP 0392323 A1 which corresponds to U.S. Pat. No. 5,137,495. These couplings are used, for example, in multicolor printing machines. In multicolor printing machines, the rollers of the individual printing groups are driven by primary shafts, where a shaft coupling is arranged between each primary shaft and each journal of a shaft of a print roll. The print rolls respectively are carried in a corresponding lateral frame. The construction of the known shaft coupling necessitates that in order to replace the printing cylinders, the latter must be withdrawn in the direction of their shafts from the lateral frame. This leads to a costly construction, since the roller must be withdrawn through the lateral frame. Also, the handling associated with replacement of the print roll is complicated and costly.

SUMMARY OF THE INVENTION

It is the purpose of the present invention to make available a shaft coupling that enables a simpler replacement of the print roll.

This problem is solved according to the invention in that, for a shaft coupling of this generic type, a stud projects beyond the periphery of a journal on the end of a shaft and can be pushed into a centering cutout arranged on a sleeve, provided on the end of the other shaft and running perpendicular to the axis of the shaft, and can be fixed there by means of a bearing surface provided on a slide ring which can be pushed over the sleeve. This construction enables the roller to be inserted into the lateral frame from the side. Here, corresponding slots to which the centering cutout of the sleeve must be aligned are all that need be provided in the lateral frame in order for one to be able to insert and couple the print roll. The connection between the print roll and primary shaft is then produced by pushing over the slide ring, causing the bearing surface to rest against the projecting stud by this means.

Accordingly, two sides of the stud can project beyond the journal and both ends can feature beveled surfaces at the respective peripheral sides. In addition, the stud can be twisted slightly relative to the journal. This ensures that when the slide ring is pushed over, the beveled surfaces of the stud are supported in the slide ring with the stud precisely in the correspondingly beveled bearing surface.

According to a further preferred configuration, a spring-loaded piston, to which the slide ring is connected, can be arranged in the sleeve. The slide ring which is rigidly connected to the piston is also acted upon by means of a corresponding compression spring which acts upon the piston. At the same time, the slide ring is retained in the closed position over the sleeve by means of spring force. The piston can be withdrawn against the spring force by means of a corresponding connecting rod, which can be part of a piston-cylinder unit, so that the slide ring can be simultaneously withdrawn from the closed position of the coupling into the open position.

BRIEF DESCRIPTION OF THE DRAWINGS

Further details and advantages of the invention are more closely explained with the aid of an embodiment example represented in the drawings.

DETAILED DESCRIPTION OF THE PREFERRED EMBODIMENTS

Figure 1:
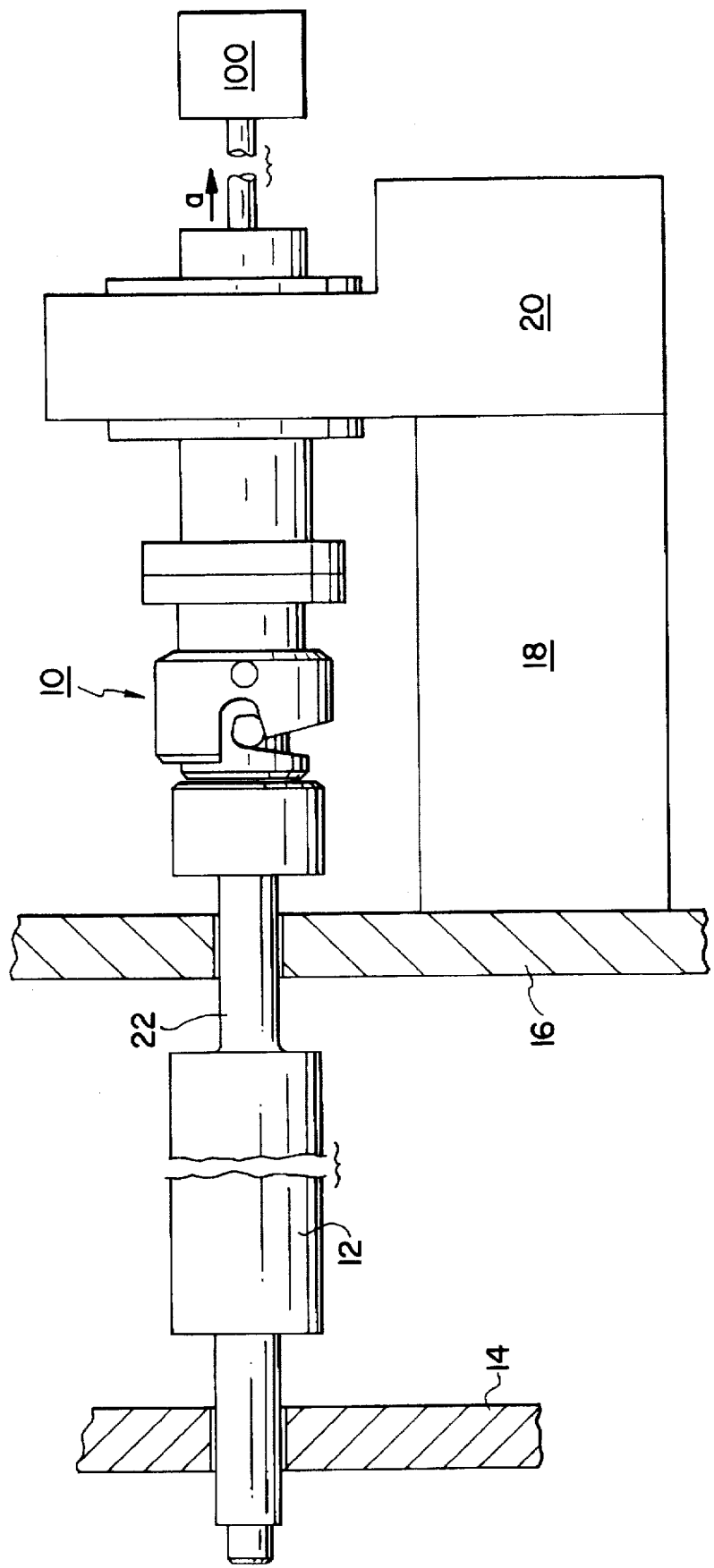
FIG. 1: A side view of an incorporated coupling, according to an embodiment of the present invention, in use with a printing machine.

FIG. 1 shows the incorporation, within a printing machine, of a shaft coupling (10) according to the invention. Here, a printing cylinder (12) of a multicolor printing machine is carried in lateral frames (14,16). The lateral frame (16) is connected by means of a crosshead (18) to a linkage (20). The coupling (10) is arranged between the lateral frame (16) and linkage (20).

Figure 2C:
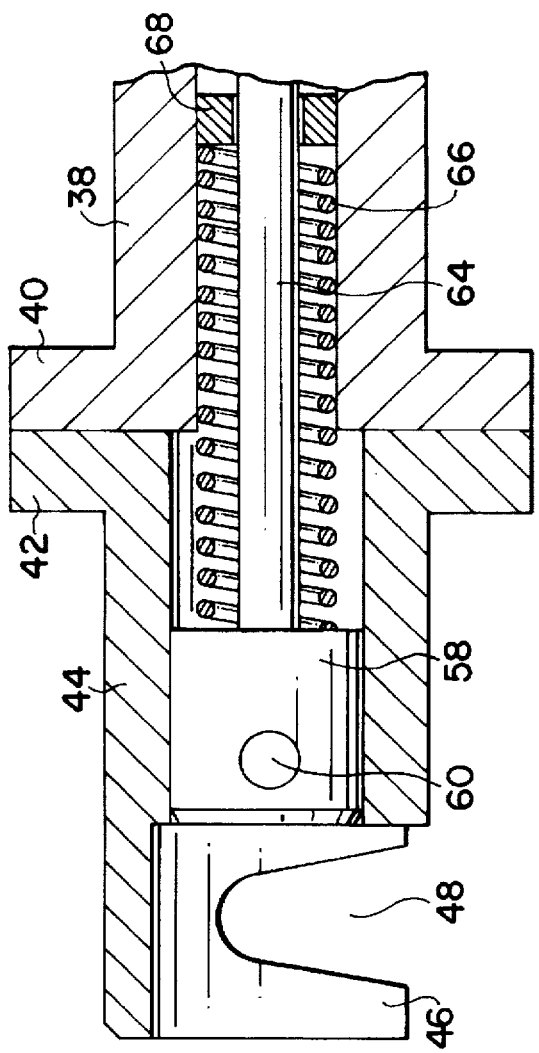
FIGS. 2a–2d: Schematic views of parts of the coupling, in partial cross section.
Figure 2D:
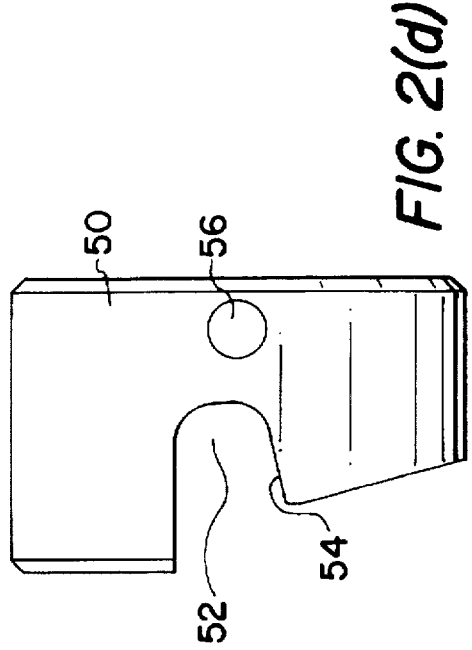
Figure 2A:
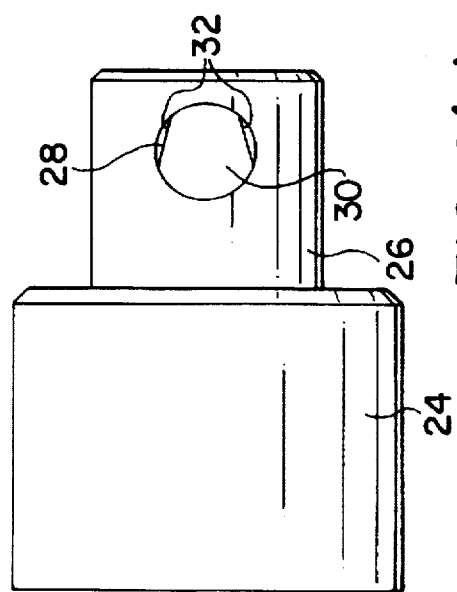
Figure 2B:
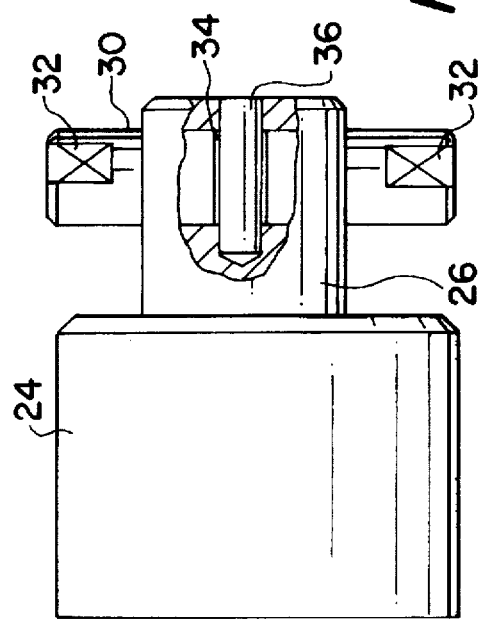
Figure 3:
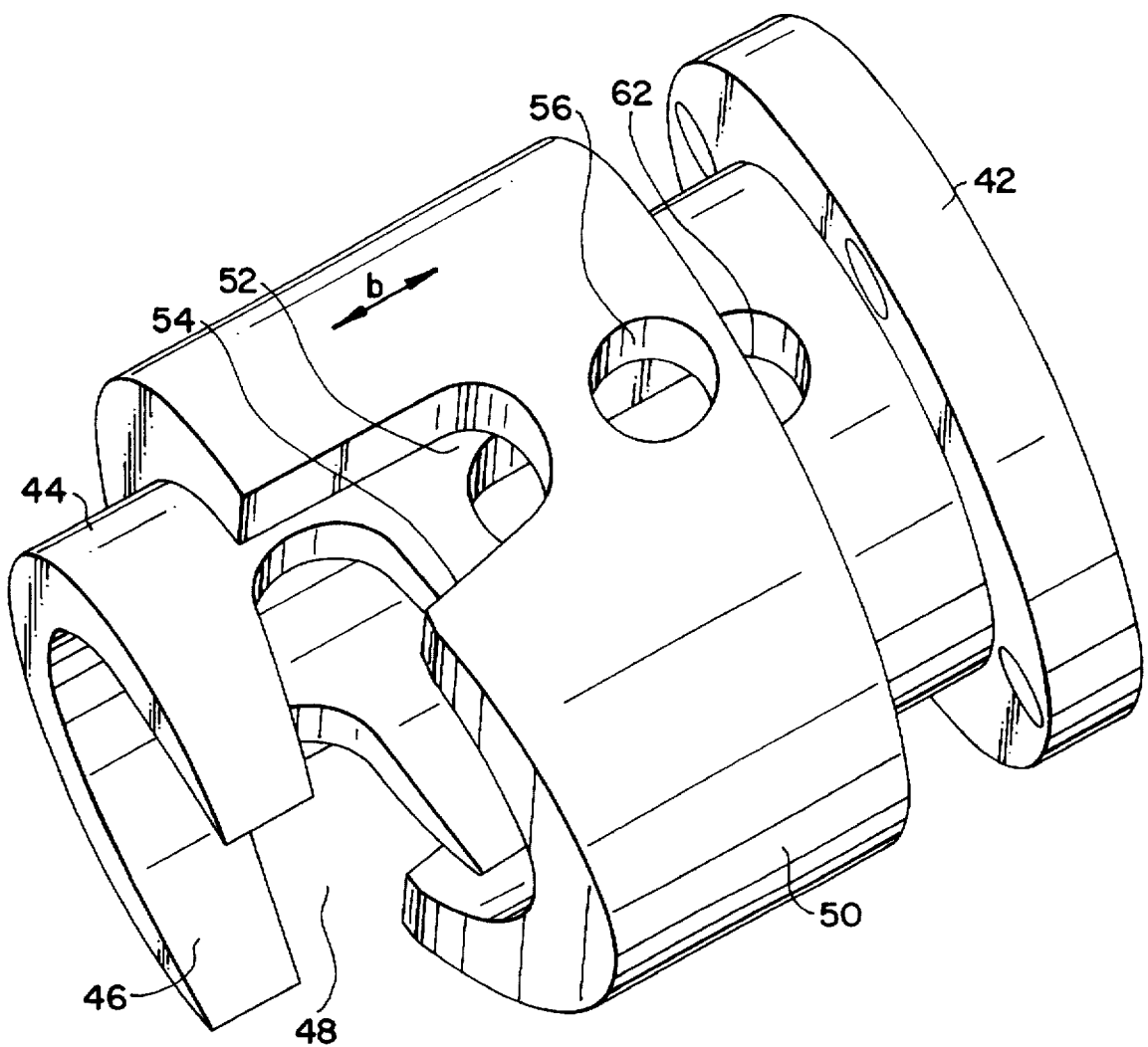
FIG. 3: A perspective view of a section of the coupling according to the embodiment shown in FIGS. 1 and 2.

The construction of the coupling (10) according to the invention is shown in FIGS. 2 and 3. In FIGS. 2a and 2b, the part of the coupling which is arranged on the shaft (22) of the print roll (12) is represented. The coupling is composed of an adapter (24), which passes into a journal (26) of smaller diameter. A transverse hole (28) is formed in the journal (26), a stud (30) is placed through the transverse hole and its two sides project beyond it, as shown in FIG. 2b. The respective ends of the stud (30) feature beveled surfaces (32) on the respective opposing sides, which are beveled in the axial direction of the journal (26), as can be seen, for example, in FIG. 2a. A through-hole (34) is also provided in the stud (30); the hole is engaged by a pin (36) which is driven in from the end of the journal (26) as shown in FIG. 2b. The drilled hole (34) in the stud (30) has a slightly greater diameter than the pin (36), so that the stud (30) as a whole can be rotated slightly relative to the journal (26).

The construction of the section of the coupling (10) developed at the primary shaft (38) is shown in FIGS. 2c and 2d. A flange (42) of a sleeve (44) is connected to an end flange (40) of the primary shaft (38). The end of the sleeve (44) features a fork-shaped piece (46) with a centering cutout (48). The centering cutout (48) runs perpendicular to the central axis of the sleeve (44) or primary shaft (38). Carried to be movable on the sleeve (44) is a slide ring (50), shown by itself in FIG. 2d and in a pushed-on position in FIG. 3. The slide ring likewise features a cutout (52) with a bearing surface (54), where the cutout (52) is, in essence, aligned to be perpendicular to the cutout (48). A through-hole (56) is also formed in the slide ring (50).

As shown in the section in FIG. 2c, a movable piston (58), in which a through-hole (60) is formed travels in the sleeve (44). Running through the through-hole (60) is a stud, not represented in greater detail, which runs through the through-holes (56) of the slide ring (50), as well as through a slot (62) within the sleeve (44) (compare FIG. 3). Hence, the slide ring (50) is connected to the movable piston mounted in movable fashion within the sleeve by means of the stud, not represented in greater detail. End positions for the piston (58) as well as for the slide ring (50) are defined by means of the slot (62), in connection with the stud, not represented in greater detail. The slide ring (50) can be moved, together with the piston (58), in the direction of the double arrow (b) (see FIG. 3). Here, one of the end positions, which occurs through a stud (not represented) and comes to rest at the left side of the slot (62), as shown in FIG. 3, is the closed position of the slide ring and of the coupling, in which the bearing surface (54) rests against one of the beveled surfaces (32) of the stud (30), as is shown in FIG. 1. The opposing bearing surface of the slot (62) establishes the open position of the slide ring (50).

In the embodiment represented here, a connecting rod (64), which first runs through the sleeve (44) and then through the primary shaft (38) of hollow form, is joined to the piston (58) running within the sleeve (44), and, as represented in FIG. 1, is guided out laterally. The free end of this connecting rod (64), guided out laterally, is connected to a piston-cylinder unit, not represented in greater detail. As shown in FIG. 2c, a compression spring (66), arranged parallel to the connecting rod (64), bears against the piston (58) at one end and, at the other end, against limit stops (68), is provided within the primary shaft (38). Therefore, the compression spring (66) can press the piston (58), and thus the slide ring (50), into the closed position, as represented in FIG. 1. The piston (58), and thus the slide ring (50) can be moved in the direction of the arrow (a) according FIG. 1 against the force of the compression spring (66) by means of the piston-cylinder unit, (100). Hence, this creates a simple automatic closing mechanism.

I claim:

1. A shaft coupling for coupling a journal of a shaft of a print roll to a primary shaft, with coupling parts which engage with one another in interlocking fashion and which are connected to the shafts to be coupled to one another, wherein a stud projects beyond the perimeter of the journal at an end of one shaft and can be pushed into a centering cutout arranged in a sleeve provided at an end of the other shaft and fixed there by means of a bearing surface provided in a slide ring which can be moved over the sleeve, and wherein two sides of the stud project beyond the journal, wherein arranged in the sleeve (44) is a spring-loaded piston (58) which is connected to the slide ring (50), while the spring-loaded piston (58) is connected by means of a piston-connecting rod (64) to a piston-cylinder unit, by which means the piston can be moved against a spring force (66).

2. A shaft coupling according to claim 1, wherein the two ends of the stud (3) comprise beveled surfaces (32) on the respective sides of the perimeter, and the stud (30) can be twisted slightly relative to the journal.

3. The shaft coupling of claim 1, wherein the stud can be twisted slightly relative to the journal.

4. A shaft coupling for coupling a journal of a shaft of a print roll to a primary shaft, with coupling parts which engage with one another in interlocking fashion and which are connected to the shafts to be coupled to one another, wherein a stud projects beyond a perimeter of the journal at an end of one shaft and can be pushed into a centering cutout arranged in a sleeve provided at an end of the other shaft and fixed there by means of a bearing surface provided in a slide ring which can be moved over the sleeve, while a spring-loaded piston is arranged in the sleeve, and the spring-loaded piston is connected with the slide ring.

5. A shaft coupling for coupling a journal of a shaft of a print roll to a primary shaft, with coupling parts which engage with one another in interlocking fashion and which are connected to the shafts to be coupled to one another, wherein a stud projects beyond a perimeter of the journal at an end of one shaft and can be pushed into a centering cutout arranged in a sleeve provided at an end of the other shaft and fixed there by means of a bearing surface provided in a slide ring which can be moved over the sleeve, while a spring-loaded piston is arranged in the sleeve, the spring-loaded piston is connected with the slide ring, and is connected by means of a piston connecting rod to a piston-cylinder unit, by which means the piston can be moved against a spring force.

\* \* \* \* \*